United States Patent [19]

Medina

[11] Patent Number: 5,081,530
[45] Date of Patent: Jan. 14, 1992

[54] THREE DIMENSIONAL CAMERA AND RANGE FINDER

[76] Inventor: Antonio Medina, P.O. Box 1002, Pasadena, Calif. 91102

[21] Appl. No.: 593,243

[22] Filed: Oct. 5, 1990

Related U.S. Application Data

[63] Continuation-in-part of Ser. No. 66,497, Jun. 26, 1987, and a continuation-in-part of Ser. No. 232,424, Aug. 15, 1988, Pat. No. 4,945,408, and a continuation-in-part of Ser. No. 352,159, May 15, 1989.

[51] Int. Cl.$^5$ ............................................. H04N 13/02
[52] U.S. Cl. ......................................... 358/88; 358/89
[58] Field of Search ........................ 358/88, 89, 91, 90, 358/92, 95, 3; 356/1-6; 364/522

[56] References Cited

U.S. PATENT DOCUMENTS

| | | | |
|---|---|---|---|
| 3,536,921 | 10/1970 | Caulfield | 358/89 X |
| 3,682,553 | 8/1972 | Kapany | 358/95 X |
| 3,705,261 | 12/1972 | Langley | 358/88 |
| 3,860,752 | 1/1975 | Adler | 358/88 X |
| 4,195,221 | 3/1980 | Moran | 358/95 X |
| 4,854,698 | 8/1989 | Schmidt | 358/96 X |

Primary Examiner—Victor R. Kostak
Attorney, Agent, or Firm—Wolf, Greenfield & Sacks

[57] ABSTRACT

A three dimensional camera system in which a precisely timed beam of energy is emitted from a single source with the beam illuminating the scene. The reflected energy from the beam is detected with a camera whose sensitivity is precisely timed and synchronized with the emitted beam. The reflected energy is separated and segregated according to the time of arrival at the camera. One or more cycles of energy are emitted, the camera segregates reflected energy during each cycle by separately storing the energy detected before and after a given time. The ratio of two consecutive separately detected energies conveys depth or third dimension. Signals can be displayed to a viewer to create a stereoscopic image or used by a machine for automatic response to a three dimensional environment.

32 Claims, 4 Drawing Sheets

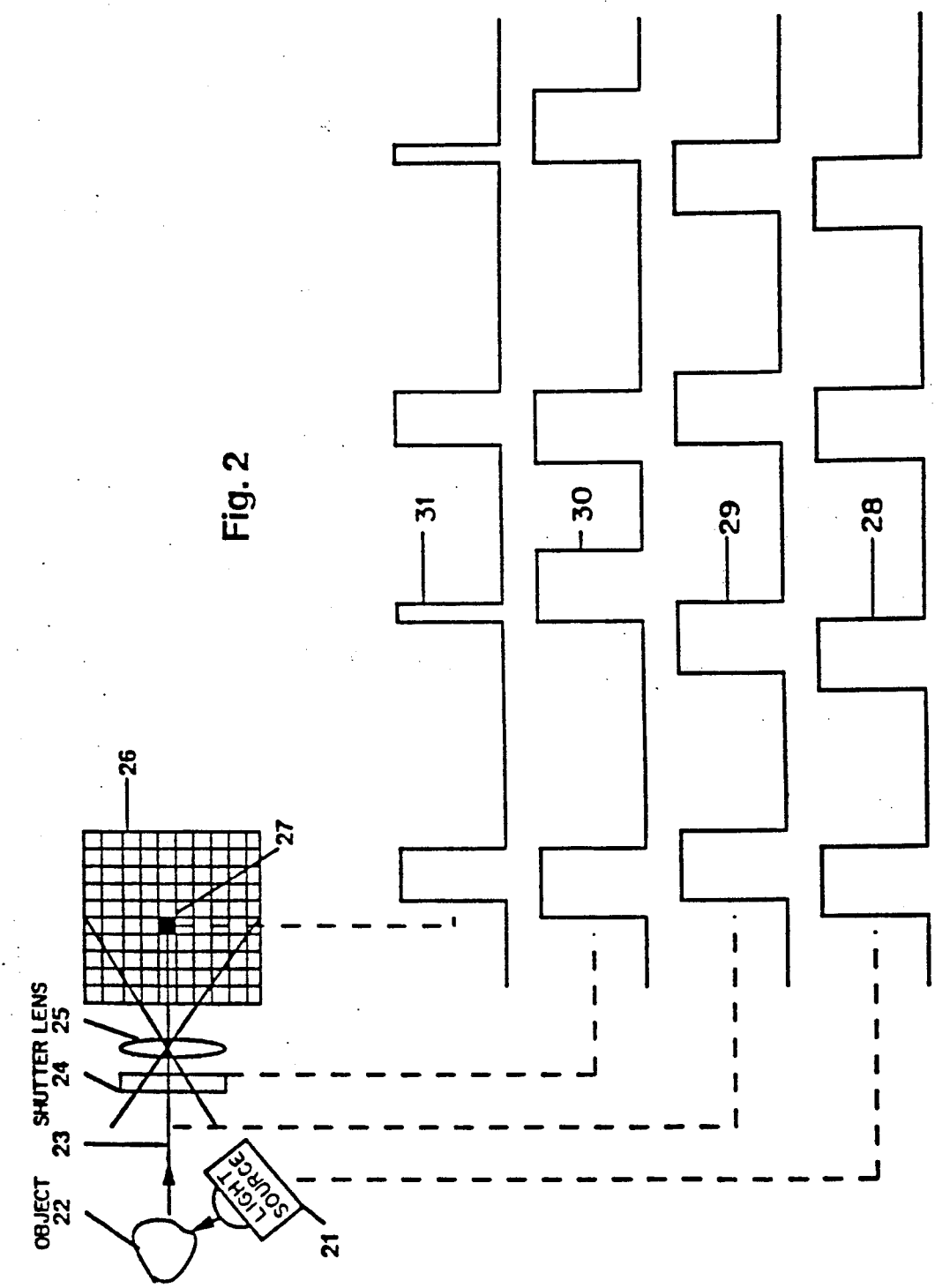

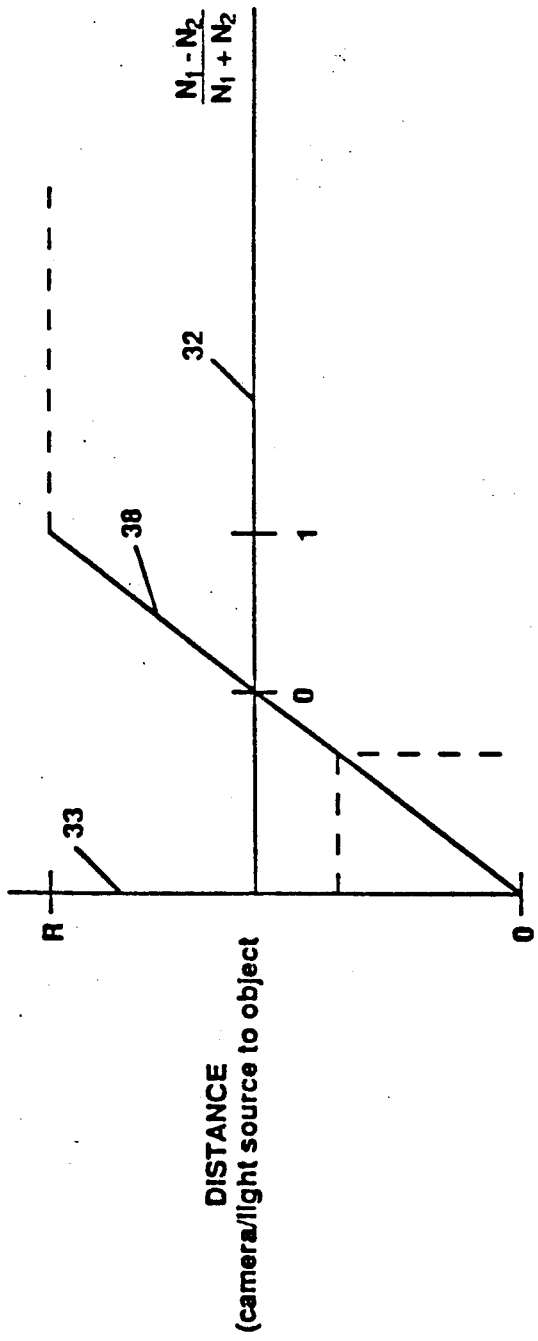
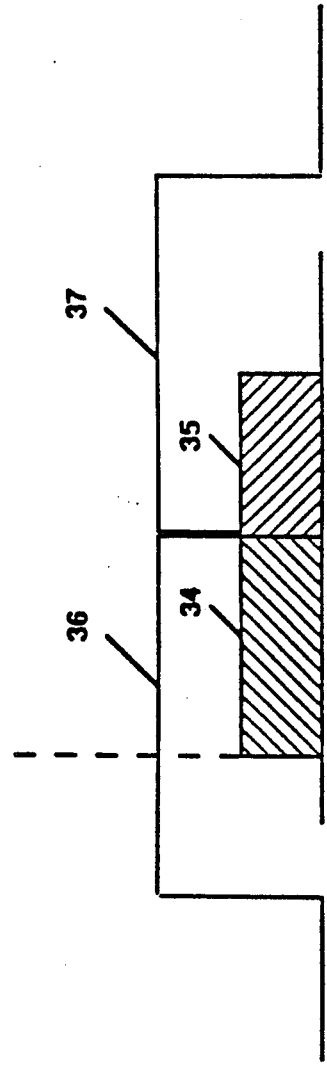

THREE DIMENSIONAL CAMERA AND RANGE FINDER

PRIOR APPLICATIONS

This is a continuation-in part of Ser. No. 07/066,497 filed June 26, 1987; Ser. No. 07/232,424, filed Aug. 15, 1988, now U.S. Pat. No. 4,945,408, issued July 15, 1990; and Ser. No. 07/352,159, filed May 15, 1989.

SUBJECT MATTER OF INVENTION

The present invention relates to means for recording and displaying three dimensional images by a system which utilizes one energy source and one energy detector.

BACKGROUND OF INVENTION

Prior art 3 dimensional cameras rely on systems which capture two different images from two locations and present each image to each eye by means of well known devices, such as stereoviewers or stereoscopes.

Most recently, the recording of two stereoscopically related images from a single point in space, but requiring two separated scanning beams to illuminate the scent, was described in U.S. Pat. No. 4,654,699.

Additionally, three dimensional video images of an object or a scene have been effected with a single beam without using a camera. In such a system, the object is illuminated by modulated scanning light, such as a laser beam, which moves over the scene in a raster similar to the movement of an electron beam in a CRT. The modulated light from the laser beam reflected by the scene is picked up by a sensor which controls the beam intensity of a cathode ray tube of a video monitor. Thus, as the laser beam scans the object, the sensor senses variations in the reflected light, the phase of which is proportional to distance.

In addition to such systems, numerous efforts have been made to create a wide range of three dimensional imaging systems. Some of these systems have been described in a number of issued U.S. patents, including U.S. Pat. Nos. 1,372,645; 1,595,295; 2,235,743; 2,360,322; 2,568,327; 2,751,826; 3,039,358; 3,731,606; 3,810,213; 3,990,087; 4,009,951; 4,189,210; 4,290,675; and 3,431,299.

OBJECTS AND SUMMARY OF INVENTION

It is an object of the present invention to provide a novel system for generating three dimensional images which utilizes an energy source selected from a wide frequency spectrum. Thus, the present invention is designed to generate three dimensional images utilizing visible light waves or other wave lengths, such as infrared, ultraviolet, or x-rays with a suitable detector. Additionally, the present invention is designed for use with other types of radiation source different from electromagnetic waves, such as ultrasound.

A further object of the present invention is to provide a means for generating stereo pairs of images of an object, making use of an energy sensitive means, which generates a pair of signals which may be appropriately channeled for stereoscopic viewing.

A further object of the present invention is to provide an improved means for generating three dimensional images without the use of a pair of cameras and by means which may be adaptable for use in a variety of systems and for a variety of purposes.

A further object of this invention is to provide an improved means and method that may be adopted for generating three dimensional images in video broadcasting or recording, video monitoring, and surveillance and reconnaissance systems.

A still further object of the invention is to provide an improved means of three-dimensional imaging capable of superior performance in the presence of ambient light or in the presence of light scatterers, such as in fog, rain, dust, or underwater.

The present invention provides an improved means for generating three dimensional images which may be detected and transmitted either in analog or digital form.

In the present invention, three dimensional information of a scene is obtained by means of a single energy source, such as a light source, and by means that differentiate the relative distance of objects in the scene as a function of the different time required by the energy to reach the object, reflect and reach the detector means.

In this invention, an energy source used in conjunction with an image sensor and suitably modified still or motion camera, renders three dimensional stereoscopic images when viewed with known stereo viewing devices. Alternatively, three dimensional information can be used for machine operations.

In one embodiment of the present invention, the scene is illuminated uniformly with an energy by means, such as a flood light, flash light, or laser light. The intensity of the energy is pulsed periodically by suitable means, such as a gas tube or laser powered with pulsating electrical current or by means of an external modulator in front of the light source. The phase of the reflected energy is a function of the distance of the reflecting object. Detecting the phase of such energy is accomplished by segregating the reflected energy with a shutter that opens and closes in synchronization with the pulsed light source. The shutter opens at different times for every other cycle, following the onset of the light source. The ratio of the light collected by a standard camera during those times is a measure of the phase of the signal detected.

In another embodiment of the invention, no shutter or gating is used, but detected energy is directly segregated at the sensor by transferring the energy detected during part of each cycle. The energy detected during the other part of each cycle is transferred or stored separately. This is achieved by using the well known interline transfer charge couple device (CCD) in such a way that energy collected in the pixels in the form of electrons is transferred to the transport registers until a given time during each cycle of emitted energy. The rest of the detected energy is stored in the pixels and later read through different transport registers or through the same registers used for transferring charge during the first part of the cycle. The ratio of energy so segregated is related to the distance of the object reflecting it. A single cycle or pulse of energy is sufficient to acquire a three-dimensional image.

BRIEF DESCRIPTION OF THE DRAWINGS

FIG. 2 depicts an embodiment of the present invention using a solid state sensor camera and time representation of light energy at the source, before the shutter and at the focal plane.

FIG. 3 depicts an improved mean to detect distance with a single pulse of light that is segregated by means of charge transfer in a charge couple device sensor of the interline transfer type. It illustrates the linear relation between distance and the ratio of light collected in a single frame in an arrangement similar to that of FIG. 2.

DETAILED DESCRIPTION OF THE INVENTION

Figure 1:
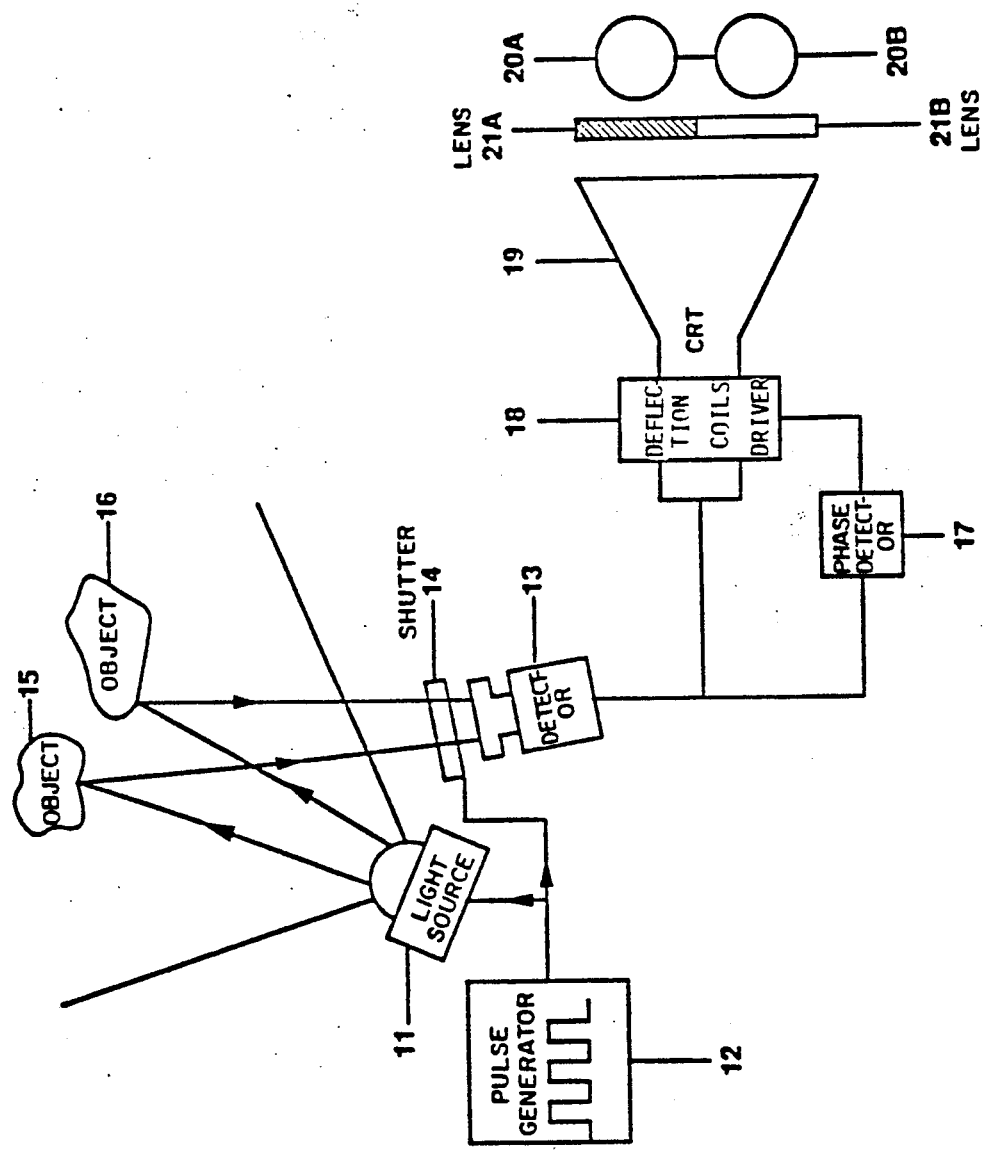
FIG. 1 is a schematic top view of an embodiment of the present invention using a pulsed beam of energy illuminating a scene. It shows how a shutter in front of a camera allows light at two successive exposure times to achieve detection of phase or distance.

FIG. 1 depicts an embodiment of the present invention for TV, video or still video applications. A light source such as a strobe lamp 11 is used whose intensity is modulated by a high frequency pulse generator 12. A detector means comprises a standard camera 13 and shutter 14 synchronized to pulse generator 12.

Light emitted from source 11 and reflected from objects 15, 16 must travel a different distance to reach the camera 13. The phase of the light intensity at the shutter location is therefore proportional to the distance of the imaged objects 15 and 16. By opening the shutter in synchronization and in succession with the strobe lamp 11, phase detection is accomplished by calculating the ratio of pixel intensity of successive frames in phase detector 17. The output voltage of phase detector 17 may be further processed for stereo display, or simply added to or subtracted from the conventional cathode ray tube (CRT) sawtooth deflection voltage applied to deflection coils 18 to produce a relative shift of objects 15 and 16 on the face of the CRT 19. When sawtooth and phase signals are added, objects 15 and 16 are imaged closer together and when subtracted they are shifted apart. When these images are presented to each eye 20A and 20B by conventional means, stereoscopic depth sensation arises. Means such as a pair of spectacles having alternating shutters for the lenses 21A and 21B may be used to present separate images to each eye. Stereoscopic sensation can be made identical to that experienced by conventional means if measured phase displacements are corrected to match the square law response of stereo human vision. No display means is needed if the electronic depth information is used for automated machine operations.

FIG. 2 illustrates an arrangement of flash and shutter pulses for phase detection and the output of a representative pixel of a solid state sensor camera.

Flash lamp or laser 21 emits pulses of light 28, the time spacing between pulses is a frame interval that could be equal to 1/30 seconds as in American TV standards. The pulse width is much shorter than the frame time (for rejection of ambient light or noise) and preferably equal to the time required for light from the source 21 to reach the sensor 26 after reflection off an object at the furthest distance of interest.

Object 22 in the scene reflect light pulses 28 emitted by source 21. At the camera location 23, light pulses 29 are received but delayed with respect to pulses 28 at the source because of the finite velocity of travel of light. Shutter 24 is depicted in front of the lens 25, but could be placed behind it, or could be an integral part of the sensor 26. The shutter 24 opens as indicated by waveform 30. The opening and closing of shutter 24 in accordance with the cycle of waveform 30 is controlled by a signal derived from waveform 28. The shutter is opened once by each pulse of waveform 30. However, the interval between one opening and consequently successive opening of the shutter is not uniform. Every other opening is delayed by a time interval equal to the duration of one pulse of waveform 28. The time between successive pulses is consequently not uniform with one set of alternate intervals longer than the intermediate set, thereby establishing what is referred to hereafter as odd and even frames. The shutter remains open in this preferred embodiment for the same time length as the source pulse width.

Light collected at each pixel 27 in the sensor at the focal plane is the light intensity passing through the shutter 24, and equal to the product of waveforms 29 and 30 and as depicted in waveform 31. Pulses of light corresponding to successive frames, waveform 31, are of different width. Their area difference is related to phase and therefore is related to the distance of the imaged object element from the camera. For example, if the object were immediately in front of the camera and the light source were adjacent the camera, the time delay represented by waveform 29 would not be substantial and therefore every other pulse in waveform 31 would be suppressed. As noted in greater detail below, these differences in successive pulses will provide adequate information to determine relative distance of different objects from the camera.

FIG. 3 depicts an improved means to detect phase (or distance) from a single pulse of light (shaded area) that is segregated by means of charge transfer in a charge couple device sensor of the interline transfer type. It illustrates phase (or distance) 33 as a function 38 of normalized difference 32 between areas 34 and 35 corresponding to electrons collected in a charge couple device before and after the transfer gate is closed. The ordinate 33 represents the distance of the object from the camera and light source. The abscissa 32 is the normalized difference as determined by the formula $$\frac{N_1 - N_2}{N_1 + N_2}$$

where $N_1$ and $N_2$ are, respectively, the electrons collected on the CCD before and after transfer of pixel charge to vertical transport registers. The difference between 35 and 34 divided by their sum is defined as a normalized difference 32 which is linearly related to phase (or distance) 33. The amplitude of pulses 34 and 35 is proportional to the brightness of the object. Therefore, one cannot rely simply on the differences in pulse area. For that reason, the difference must be divided by the sum. This, as noted, is the "normalized difference". Thus, line 38 represents the relation between normalized difference and the distance of the objects to the camera light source. This relation is:

$$\text{distance} = \frac{R}{2} \times \frac{N_1 - N_2}{N_1 + N_2} + \frac{R}{2},$$

where R is the maximum range, equal to half the distance traveled by light through the duration of a pulse of the light source. In this embodiment, the timing of the light source is a depicted in FIG. 2, while the processing of the two segregated images to derive distance is the same as for the embodiment described with FIG. 4.

Figure 4:
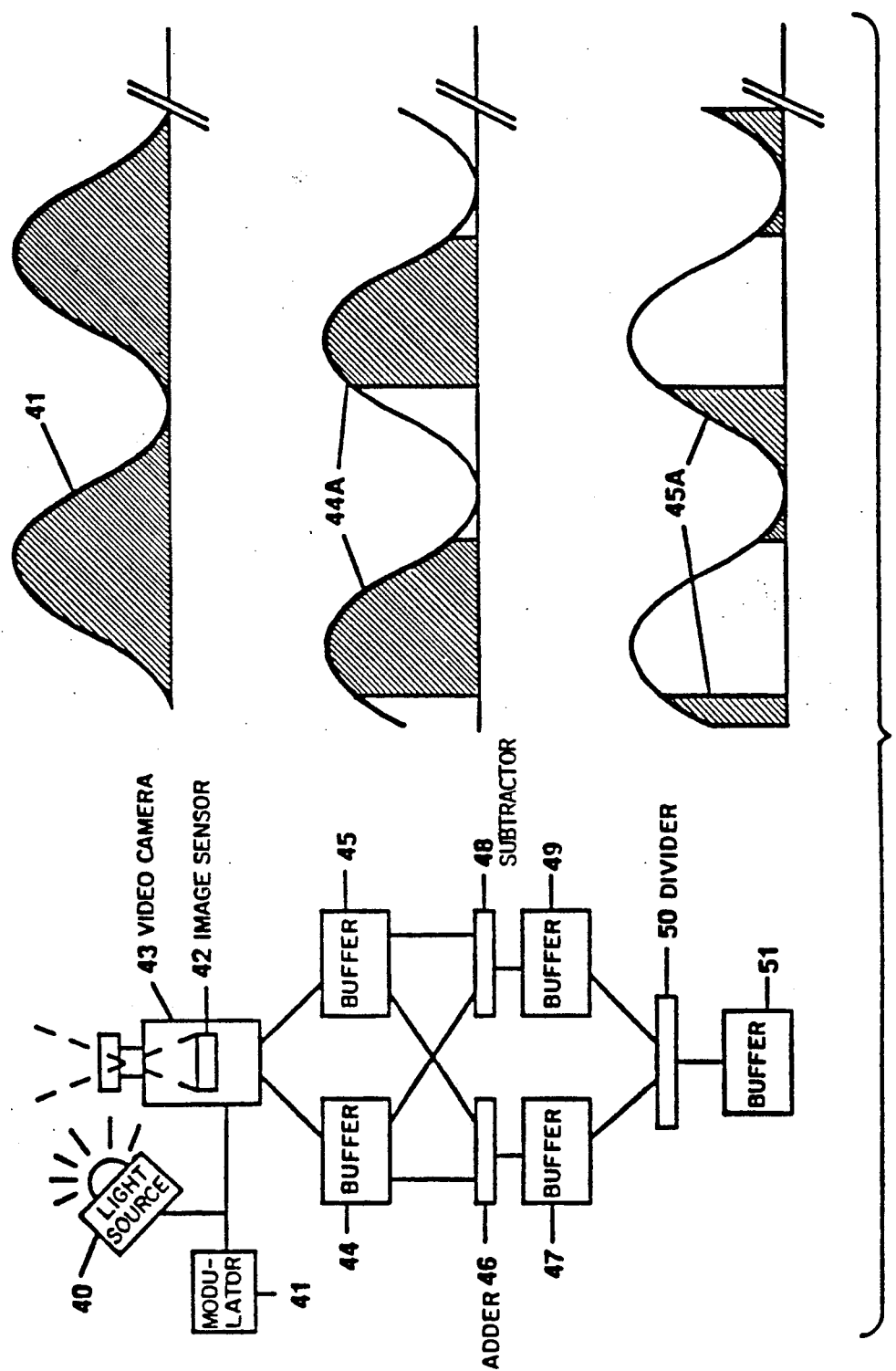
FIG. 4 depicts a schematic embodiment of the present invention using a beam of energy modulated sinusoidaly illuminating a scene. It illustrates how a shuttered sensor in the camera opens and closes in alternation to detect phase or distance.

FIG. 4 depicts an embodiment of the present invention in which the illuminating beam of energy is modulated sinusoidaly rather than with pulses. The figure illustrates the detection of phase in this embodiment by means of a shutter that opens and closes continuously for the duration of a frame or field. The phase detector block diagram illustrated is common to other embodiments of this invention.

Light source 40 is modulated with a periodical waveform by modulator 41 at frequency f. The CCD image sensor 42 in video camera 43 is shuttered on and off at the same frequency f, in synchronization and in phase with the light source 40 for a video frame period. In this way, during half of the frame time, no light is collected (or diverted to a vertical register of an interline transfer CCD) and a digital image is formed and stored in buffer 44 from light received during the time the shutter is opened only. Buffer 44 contains the photoelectron count $N_1$ (in connection with reference to FIG. 3) for every pixel of the CCD. For example, for an image of 500×500 pixels, buffer 44 must be organized as a 250,000 element memory. During the next frame, the on off cycles are reversed so that they are in synchronization with the light source, but in opposed phase. A second and different digital image is temporarily stored in buffer 45 which thus functions to store photoelectron count for every pixel, $N_2$ referred in connection with reference to FIG. 3. Images are stored by conventional means; energy impinging on each picture element (pixel) of the CCD is stored separately as a digital or analog value.

Energy collected from an arbitrary pixel of the image sensor during a frame exposure time is schematically depicted as 44A, while energy collected from the same pixel during the next frame exposure time is illustrated a 45A. The digital (or analog) value for that pixel will be the shaded area 44A (for buffer 44) or 45A (for buffer 45) integrated during a frame time (1/30 seconds for American TV).

The addition (pixel by pixel) by adder 46 of buffers 44 and 45 results in buffer 47 which contains a conventional image of the scene. The subtraction of buffers 44 and 45 by subtractor 48 results in buffer 49 containing phase information. It can be see that the result of subtracting total light energy for the same pixel in alternate frames (shaded areas of waveforms 44A and 45A) is dependent on the shift of the sine waves, this is, the phase. Range (distance) is obtained at buffer 51 as a phase measurement by dividing relative phase from buffer 49 amplitude from buffer 47 by means of divider 50. Depending on the distance to the picture element, the phase measurement will vary between the values −1 and +1 for each pixel.

In this invention, the shutter delay repetition rate is not limited to only two consecutive cycles, lines, fields or frames, but the delay can increase progressively, as is the case in an energy source (or shutter) modulated in frequency.

The duration of the energy pulses and the shutter openings are not limited to those in the description above. These durations and timings should be selected to suit the application and the scene distances of interest.

This invention is not limited to the energy sources or to the applications described above, but it can be used with other types of energy, such as electromagnetic radiation, including coherent and incoherent light and infrared, sound, ultrasound, electrons, x-rays, etc., and in any propagation media, such as, but not limited to, air, water, space, soil, biological tissue, etc. This invention can therefore be used for multiple imaging applications, such as, but not limited to, broadcast and close circuit TV, land and air radar, sonar, depth sounders, electron microscopes, ultrasonic medical imaging, and automated vision machines.

What is claimed is:

1. A three-dimensional camera system comprising:
   means for emitting a beam of energy;
   image detector means for detecting said energy when reflected from objects;
   means to segregate said detected energy according to the time of arrival at said detector means, resulting in a least two segregated energies; means for extracting information related to distance of object from said segregated energies.

2. A three-dimensional camera system as set forth in claim 1 wherein said means for emitting a beam of energy includes a flashlamp.

3. A three dimensional camera system as set forth in claim 1 wherein said means for emitting a beam of energy includes a laser.

4. A three-dimensional camera system as set forth in claim 1 wherein said means for emitting a beam of energy includes a microwave emitting antenna.

5. A three dimensional camera system as set forth in claim 1 wherein said means for emitting a beam of energy includes a sonic or ultrasonic source.

6. A three dimensional camera system as set forth in claim 1 wherein said means for emitting a beam of energy includes a sinusoidal modulator.

7. A three-dimensional camera system as set forth in claim 1 wherein said means for emitting a beam of energy includes a pulsed modulator producing at least one pulse of energy.

8. A three-dimensional camera system as set forth in claim 1 wherein said means for emitting a beam of energy includes the sun and its natural variations in intensity.

9. A three dimensional camera system as set forth in claim 1 wherein detector means for detecting said reflected energy includes a video camera.

10. A three dimensional camera system as set forth in claim 1 wherein detector means for detecting said reflected energy includes a photographic camera.

11. A three-dimensional camera system as set forth in claim 1 wherein detector means for detecting said reflected energy includes a solid state device type camera.

12. A three-dimensional camera system as set forth in claim 1 wherein means for segregating said detected energy includes a shutter that operates in synchronization with said means for emitting a beam of energy.

13. A three-dimensional camera system as set forth in claim 1 wherein means for segregating said detected energy includes a solid state sensor electronically shuttered during the arrival of said energy by application of a voltage to an integral electrode.

14. A three-dimensional camera system as set forth in claim 1 wherein means for segregating said detected energy includes an interline transfer charge couple device, whose transferring of pixel charge to opaque transport registers is effected during the arrival of said detected energy, said transfer of charge being stopped before the end of arrival of energy, resulting in part of pixel charge segregated from register charge.

15. A three dimensional camera system as set forth in claim 1 wherein means for segregating said detected energy includes a gated microchannel plate intensifier that is gated during the arrival of said energy.

16. A three dimensional camera system as set forth in claim 1 wherein means for segregating said detected energy includes a liquid crystal shutter that is operated during the arrival of said energy.

17. A three dimensional camera system as set forth in claim 12 wherein said shutter opens and closes in a rectangular wave mode with a delay for every other exposure substantially equal to the duration of the opened time and to the duration of the light pulse.

18. A three dimensional camera system as set forth in claim 12 wherein said shutter opens and closes in an arbitrary wave mode with a delay for every other exposure equal to the duration of the opened time and longer than the duration of the light pulse.

19. A three dimensional camera system as set forth in claim 12 wherein said shutter opens and closes in an arbitrary wave mode with a delay for every other exposure equal to half the duration of the triangular wave.

20. A three dimensional camera system as set forth in claim 12 wherein said shutter opens and closes with a delay from the onset of said energy pulses equal to twice the distance from the camera to the scene divided by the velocity of light.

21. A three dimensional camera system as set forth in claim 12 wherein said shutter opens and closes continuously and in alternation during the duration of an exposure or frame.

22. A three dimensional camera system as set forth in claim 1 wherein said camera has a shutter which opens and closes in opposite phase every other frame.

23. A three dimensional camera system as set forth in claim 1 wherein said means for extracting said information related to distance includes means for calculating the ratio of said segregated energies.

24. A three dimensional camera system as set forth in claim 1 wherein means for extracting said information related to distance includes means for calculating the ratio of the difference and the sum of said segregated energies.

25. A three dimensional camera system as set forth in claim 1 wherein said beam of energy of periodical intensity is a train of pulses modulated in frequency; means for extracting phase information that includes shutter that operates in synchronization with the frequency of said pulses and that opens for a period of time corresponding to the phase deviation of the pulses modulated in frequency.

26. In a three dimensional camera system as set forth in claim 1 wherein said means for extracting information related to distance includes:
  a pair of memory buffers for storing successively detected beams of energy, means for adding and means for subtracting values stored in said memory buffers,
  additional buffers for separately storing the sums and differences derived from said adding and subtracting means, and means for dividing said additional buffers, one into the other to derive a normalized difference related to the distance of the object from the camera system and the beam emitting means.

27. A three-dimensional camera system means for creating a three-dimensional image including
  means for emitting a beam of energy of periodical intensity, detector means for detecting said energy when reflected from objects,
  and a phase detector means for detecting the phase difference between the beam when emitted and the beam when received.

28. In a three-dimensional camera system as set forth in claim 27, said phase detector means including a shutter and means for opening said shutter with the frequency as said means for emitting a beam but having a phase shift in alternate cycles.

29. In a three-dimensional camera system as set forth in claim 28 wherein said emitted beam is sinusoidal.

30. In a three-dimensional camera system as set forth in claim 28 wherein said emitted beam is pulsed.

31. In a three-dimensional camera system as set forth in claim 28 wherein said phase shift is equal to the duration of the emitted energy.

32. In a three-dimensional camera system as set forth in either of claims 29 or 30.
  a pair of memory buffers for storing successively detected beams of energy, means for adding and means for subtracting values stored in said memory buffers,
  additional buffers for separately storing the sums and differences derived from said adding and subtracting means, and means for dividing said additional buffers, one into the other to derive a normalized difference related to the distance of the object from the camera system and the beam emitting means.

* * * * *